United States Patent
Kuroanagi et al.

[11] Patent Number: 5,378,534
[45] Date of Patent: Jan. 3, 1995

[54] RECORDING SHEETS

[75] Inventors: Norio Kuroanagi, Tokyo; Mamoru Sakai, Urawa, both of Japan

[73] Assignee: Sansui Co., Ltd., Saitama, Japan

[21] Appl. No.: 915,828

[22] PCT Filed: Jan. 25, 1991

[86] PCT No.: PCT/JP91/00079
§ 371 Date: Jun. 22, 1992
§ 102(e) Date: Jun. 22, 1992

[87] PCT Pub. No.: WO91/11686
PCT Pub. Date: Aug. 8, 1991

[51] Int. Cl.[6] ............................................. B32B 5/16
[52] U.S. Cl. ..................... 428/327; 428/206; 428/323; 427/146; 427/180
[58] Field of Search .............. 428/308.4, 319.9, 327, 428/407, 195, 913, 914, 206, 323; 525/902; 427/146, 180

[56] References Cited

U.S. PATENT DOCUMENTS

| | | | |
|---|---|---|---|
| 2,854,350 | 9/1958 | Phillpotts | 428/499 |
| 3,031,328 | 4/1962 | Larsen | 427/394 |
| 3,684,551 | 8/1972 | Seiner | 427/152 |

FOREIGN PATENT DOCUMENTS

| | | |
|---|---|---|
| 62-220381 | 9/1987 | Japan . |
| 62-220382 | 9/1987 | Japan . |
| 63-34177 | 2/1988 | Japan . |

Primary Examiner—Patrick J. Ryan
Assistant Examiner—William A. Krynski
Attorney, Agent, or Firm—Bauer & Schaffer

[57] ABSTRACT

The recording sheet is formed by coating colored sheets with an opacifying compound prepared by mixing an aqueous suspension of polymer particles embodying internal voids dispersed with a water base coating material.

9 Claims, 2 Drawing Sheets

RECORDING SHEETS

TECHNICAL FIELD

The present invention relates to coated sheets for use in graphically recording the output of tachographs (recording tachographs), dusk meters (electrocardiographs), and other measuring instruments and, more particularly, to a recording paper printable with an inkless recording pen (stylus).

BACKGROUND ART

Recording paper, printable with a stylus, is made by forming an opaque layer on a colored substrate. The printing effect is achieved either by removing or by imparting a light transparency to portions of the opaque layer by contact with the stylus. Various types of recording papers are known in the art.

Those papers on which the recording is made by scraping the stylus over the opaque layer are made by applying a lacquer containing film forming components such as nitrocellulose or cellulose acetate on a black-colored paper and opacifying the coating (e.g., Japanese Published Patent Publication Nos. 34-8163 and 41-19274); or by applying a white coating containing titanium dioxide pigment or the like on a black-colored paper (e.g., Japanese Published Utility Model Publication No. 39-33446). Local scraping of the surface removes the coating and discloses the underlying black surface, the stylus being moved in response to an electrical signal.

For those papers to which transparency is to be imparted by the stylus, a light diffusion layer and a layer embodying solvent containing capsules are deposited on a colored paper substrate (Japanese Patent No. 520631). With this type of recording paper the recording is made by breaking the capsules with the stylus (moved in response to an electrical signal), resulting in releasing the solvents to permeate into the light diffusion layer. Thus, the light diffusion layer is made locally transparent and the underlying color of the colored substrate is disclosed.

Among the former processes, the recording paper using lacquers employ low boiling point solvents such as ketones (for example, acetone), alcohols (for example, methanol) or the like to dissolve the film forming components such as nitrocellulose or cellulose acetate. Obviously, the risk of fire and explosion are great hazards in the coating process. These components are also detrimental to the working environment as the solvents evaporate into the air. Another difficulty inherent in this process is that the lacquer coating must be subjected to a prolonged period of drying at a low temperature or a mild heating under an optimum humidity to obtain the required whitening effect. This situation is quite adverse to the improvement of productivity. Also, the recording paper that is prepared by applying a white coating has a poor appearance due to a resultant coarse surface and is deficient in print definition and printability.

The recording paper made by the latter process (i.e. requiring definite breakage of capsules by a stylus) involves the problem of slow printing speed and subsequent poor storage stability owing to the discoloration of the printed sheet.

U.S. Pat. No. 2,739,909 discloses a process by which a lacquer mixture is prepared by first introducing a W/O (water-in-oil) type emulsifier into a resinous organic solution in which PMMA is dissolved. Thereafter, water is added under agitation to disperse micron size water droplets therein. The recording paper is subsequently prepared by applying the mixture on the colored substrate which is then dried. According to the U.S. Patent, the solvents first evaporate in the drying process, and a coating film of PMMA which embodies the dispersed water droplets therein is formed. Then, when water in the droplets evaporates, the white opaque layer is formed in which voids are left in the polymer coating film.

In this case again, the polymer solution contains a large amount of solvent and does not contribute to solving the problem of fire and explosion hazards and deterioration of the working environment similar to the process using lacquers.

DISCLOSURE OF THE INVENTION

An object of this invention is to obtain commercially usable recording sheets, which can be produced under a safe condition and at a highly efficient level of productivity. As illustrated generally in FIGS. 1 and 2, the recording paper 7 is made by applying an opacifying compound on colored substrates 2, 5, respectively, to form opaque layers 6. The opacifying compound is prepared by mixing an aqueous suspension, in which polymer particles 8 embodying voids therein are dispersed, with a water base polymeric film forming vehicle. A solution or dispersion of a film forming component which uses water as a solvent or as a dispersing medium, also fits this definition as is described hereinafter. In the present description, the terminology, "aqueous opacifying compound" as used means an opacifying compound using water as a solvent.

The color substrates 2 and 5 are paper, synthetic paper, or plastic films and may be colored with inks, pigments, dyestuffs or the like, either by means of impregnating or kneading the coloring material into the substrate when formed (substrate 2 in FIG. 1) or by subsequently coating the substrates with a layer of coloring material (substrate 5 in FIG. 2). Coloring materials such as inks, pigments, dyestuffs and the like are usually black in color, but coloring materials of other colors such as red or the like may be used.

Plastic films such as polyester film, polyvinylchloride film, polyvinylidene chloride film, poly (meta) acrylate ester film, polycarbonate film, polyethylene film, polypropylene film, etc., can be used for the substrate.

Polymer particles (particles 8 as seen in FIGS. 1 and 2) embodying voids therein are disclosed in Japanese Laid-Open Patent Publications Nos. 56-32513, 60-69103, 60-223873, 61-87734, 61-185505, 62-127336, 63-110208, 63-135409, 63-213509, and are now commercially available on the market under the product names such as Ropaque OP-42, OP-62 (manufactured by Rohm and Haas Co., Ltd.), Ropaque OP-84J (manufactured by Japan Acrylic Chemical Co., Ltd.), Voncoat PP-1000, PP-1001S, PP-2000 and PP-1100 (manufactured by Dainippon Ink & Chemicals, Inc.), JSRSX-862(A) and SX-850(B) (manufactured by Japan Synthetic Rubber Co., Ltd.), and Expancel WU#642 (manufactured by Expancel Corp. and Kemanobel Corp., Sweden). It is desirable that the particle product has a core component (core) comprising a homopolymer or copolymer of methacrylic acid and a sheathing component (shell) comprising homopolymer or copolymer of styrene monomer.

In manufacturing the particles, the following known processes may be used: (I) incorporation of a blowing agent in the polymer particles and forcing the blowing agent to expand; (II) enclosure of a volatile component such as butane or the like in the polymers and forcing the butane to expand by gasification under increased temperature; (III) enclosure of a gas into melted polymers by blowing thereon a jet of air or gas, etc.; (IV) embodiment of alkali swellable substance such as carboxylic acid polymer or the like inside the polymer particles and causing its expansion by the addition of alkalis; (V) preparation of W/O/W (water-in-hydrophobic-monomer-in water) type monomer emulsions and polymerization thereof, (VI) embodiment of acid swellable polymers, such as amine polymers or the like, in the polymer particles and causing their expansion by the addition of acids; (VII) formation of voids by embodiment of hydrophobic solvents such as toluene, hexane and so on in the polymer particles; (VIII) two stage crosslinking of polymers of different compatibility on seeds comprising crosslinked polymer particles; (IX) polymerization shrinkage of polymers, and so on.

The diameter of the polymer particles 8 may be in the range of 0.01 to 50 microns, and preferably should be 0.1 tip 5 microns. Polymer particles made by the aforementioned processes possess a high opacifying power as the core component of each particle contains aerated voids.

An aqueous suspension is prepared by dispersing the above-mentioned polymer particles in water and thereafter mixed with a water base polymeric film forming vehicle to make the opacifying compound. The water base vehicle is an aqueous dispersion or solution of a coating film forming component synthesized by emulsion polymerization or solution polymerization or the like and is supplied in such forms as an aqueous solution, emulsion and aqueous dispersion. For the coating film forming component, polymer synthesized by homopolymerization or copolymerization of such monomers as acrylic esters, methacrylic esters, styrene, butadiene, chloroprene, vinylidene, vinyl acetate, etc. can be used. Also, natural or synthesized ruffer latex can be used. Polymers are modified so that they will have a glass transition temperature (Tg) of not over 100° C., preferably between −22° C. to 25° C.

A water base polymeric film forming vehicle in the form of an aqueous dispersion or an emulsion is prepared by dispersion polymers synthesized by homopolymerization of such monomers as ethyl acrylate (EA), butylacrylate (BA), 2 ethylhexylacrylate (2EHA) and butadiene or by copolymerization of these main monomers with methylmethacrylate (MMA), styrene (ST) or vinylacetate etc.

A water soluble type water base polymeric film forming vehicle may also be a polymer prepared by homopolymerization or copolymerization of the aforementioned monomers, which are partially substituted with a carboxylic group, amino group or amide group and dissolved in water in the form of alkali salt or acid salt or as is. Examples of monomers with carboxylic groups are acrylic acid (Aa), methacrylic acid (Maa), monomethylitaconic acid (MMI), 2-carboxyethyl acrylic ester, etc. Those with an amino group may be N, N'-dimethylaminoethyl acrylate, allyl amine, etc. and those with an amide group are (meta) acrylamide. The polymers are dissolved in water by transforming carboxylic acid into salts of alkali metals, amines or ammonia and amino group into salts of hydrochloric acid or acetic acid. If necessary, plasticizers (for example, dibutyl phthalate, polybutene etc.), wetting agents (for example, ethylene glycol, propylene glycol, anionic surfactants, nonionic surfactants etc.), defoamers, thickeners (e.g., hydroxyethylcellulose, sodium polyacrylate, polyvinyl alcohol, etc.), aqueous water wax emulsions (e.g., carnauba wax, polyethylene wax, paraffin wax, chlorinated paraffin wax, etc.) may be added.

The above suspensions and water base polymeric film forming vehicles are mixed arbitrarily in a ratio of between 1:9 and 9:1, the preferred ratio being between 1:3 and 6:1.

The opacifying compound thus prepared is uniformly applied on the colored substrates by an airknife coater, a roll coater, spraying or the like and controlled to keep the final thickness of the opacifying layer 6, after drying by heated air (between 50° to 200° C.), between 1 and 20 microns, and preferably between 3 and 10 microns. As shown in FIG. 5, the obtained opaque layer 6 has such a structure that the polymer particles 8, embodying voids therein, are bound by the coating film forming component of the water base vehicle to the substrate after the evaporation of water and the layer completely hides the color of the colored substrate (2 and 5) giving to the paper a normal white appearance.

The recording papers 7, constituted as described above, have a high hiding property because incident light is scattered by the voids embodied in the core of polymer particles 8 in the opaque layer 6. Also, as the water base vehicle adheres the polymer particles 8 to the substrates 2 and 5, the opaque layer does not detach from the sheets under normal treatment, yet is easily removed or made transparent or translucent by inscription of a stylus 9. The polymer particles 8 are supplied in a completely dispersed state in water, and as the opacifying compound is prepared by mixing this component with a water base vehicle, there is no danger of fire or explosion hazards in the coating process and no need to employ a whitening process.

BEST MODE FOR CARRYING OUT THE INVENTION

Embodiments of the present invention will hereinafter be described in detail with reference to the accompanying drawings.

A) Preparation of a colored substrate

Figure 1:
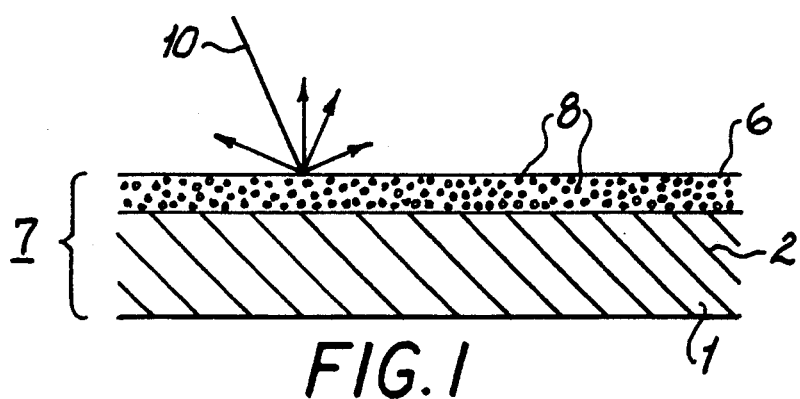
FIG. 1 is a cross sectional view of a recording paper prepared in accordance with the present invention.

As seen in FIG. 1, a high quality paper 2 (manufactured by Oji Paper Co., Ltd., having an area weight of about 150 g/m$^2$) was coated with a black ink, based on a carbon black dispersion, at the rate of 4 g solids/m$^2$ and then dried, thereby obtaining a black colored substrate 2. Also, a black ink was prepared by mixing 50 parts of a commercially available aqueous black ink (manufactured by Dainippon Ink & Chemicals, Inc., under the product name DICSAF BAG-C805 black) with 50 parts of an acrylic emulsion polymer (copolymer of MMA-Ba-Maa with Tg of −3° C.). Then, this black ink was applied on a polyester film 3 (manufactured by Toyobo Co., Ltd., at a thickness of about 100 microns) by a wire rod bar applicator No. 8 thereby to obtain a black substrate 5 on which a black coating film 4 was formed.

B) Preparation of the opacifying compounds

Water base opacifying compounds (Table 1) were obtained by mixing the opacifying components with film forming components (sample Nos. 1 through 5, (sample No. 5 is the control reference).

TABLE 1

| | Sample Nos. | | | | |
|---|---|---|---|---|---|
| | 1 | 2 | 3 | 4 | 5 |
| opacifying component | | | | | |
| Ropaque OP-62 | 25 | | | | |
| Voncoat PP-1000 | | 25 | | | |
| Ropaque OP-42 | | | 25 | | |
| Ropaque OP-85J | | | | 25 | |
| Ti-Pure P-610 | | | | | 25 |
| film forming component | | | | | |
| acryl emulsion polymer | 12.5 | | | | |
| SBR 0629 | | 12.5 | | | |
| Nikasol TS-662 | | | 12.5 | | |
| water solluble acrylic polymer | | | | 12.5 | |
| Pegar LV-19 | | | | | 12.5 |
| water | 20 | 20 | | 30 | 30 |
| auxiliary agent | | | | | |
| Fluorad FC-149 | 0.5 | | | | |
| chlorinated paraffin wax | | | 4 | | |
| Nopcosant K | | | | | 6 |
| Triton CF-10 | | | | | 0.5 |

In Table 1 the opacifying component Ropaque is a polymer particle product made by Rohm and Haas Co., with a solids content of grade OP-62, 37.5%, grade OP-42, 40.0%. Ropaque OP-85J is a product of the Japan Acrylic Chemical Co., Ltd. and has a solids content of 42.5%. Voncoat PP-1000 is a polymer particles product of Dainippon Ink & Chemicals, Inc., with a solids content of 45%. Ti-Pure P-610 is a powder of titanium dioxide produced by E.I. du Pont de Nemours & Company but is not a polymer particle product.

The acrylic emulsion polymer in the film forming component is a copolymer of BA and Maa in the ratio of 97:3 and has a Tg of −50.5° C. with a solids content of 45%. SBR 0629 is a product of Japan Synthetic Rubber Co., Ltd., and is essentially a styrene butadiene latex. Nikasol TS-662 is an adhering type acrylic emulsion polymer manufactured by Nippon Carbide Industries Co., Inc. A water soluble acrylic polymer comprises EA and monomethylitaconic ester in the ratio of 80:20, has an average molecular weight of 10,000 with a solid content of 30% and is supplied as an ammonium salt aqueous solution. Pegar LV-19, a product of Koatsu Gas Kogyo Co., Ltd., is an acrylic emulsion polymer for adhesives, having a solids content of 55.5%.

Auxiliary agent, Fluorad FC-149 is a product of Sumitomo 3M Co., and is an aqueous solution with a 1% active ingredient. Chlorinated paraffin wax is an aqueous emulsion with a 40% solids content. Nopcosant K is a dispersion agent based on sodium polyacrylate manufactured by San Nopco Co. Ltd. Triton CF-10 is a nonionic surfactant supplied by Rohm and Haas Company.

C) Preparation of recording paper

Figure 2:
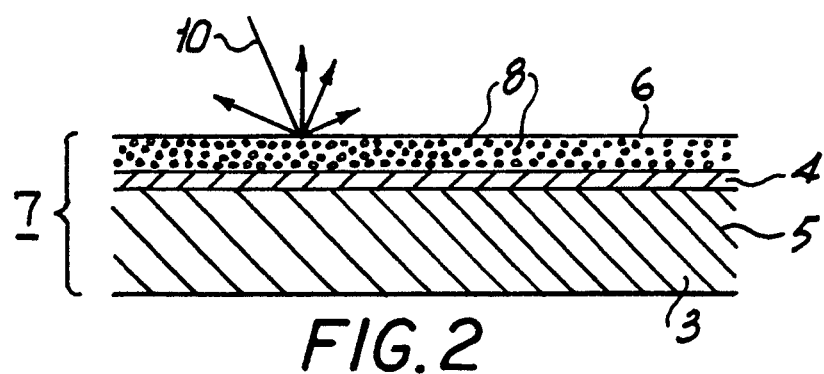
FIG. 2 is a cross sectional view of a recording paper prepared in accordance with a second embodiment of the present invention.

The recording paper 7 (sample Nos. 6 through 10, sample No. 10 being for reference data) was prepared by applying the opacifying compounds (sample Nos. 1 through 5) on the black substrate 5 of FIG. 2 by the wire rod bar applicator No. 12 and drying the opacifying compounds at 50° C. for 30 minutes to provide the opaque layer 6 having a thickness of about 5 microns. Also, the recording paper 7 (sample No. 8a) was prepared by applying the opacifying compound (sample No. 3) on the black colored substrate 5 of FIG. 2 by the wire rod bar applicator No. 12 and drying the same at 50° C. for 30 minutes to provide the opaque layer 6 having a thickness of about 5 microns. In the drawing, reference numeral 8 depicts the scattered state of polymer particles in the opacifying layer 6.

D) Recording tests

Figure 3:
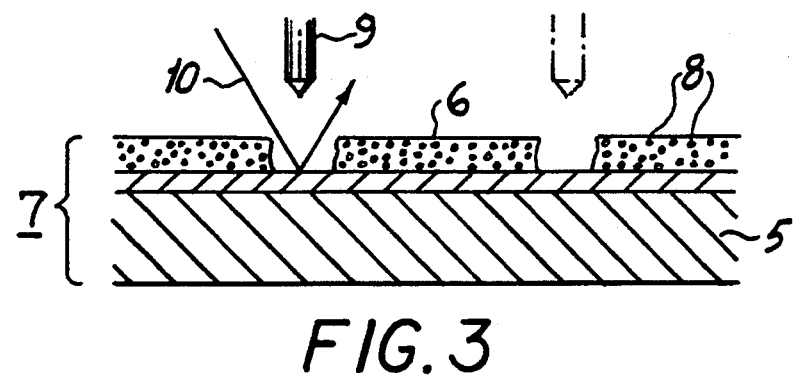
FIG. 3 is a cross sectional view of a recording paper on which the recording is made by the inscription of a stylus.
Figure 4:
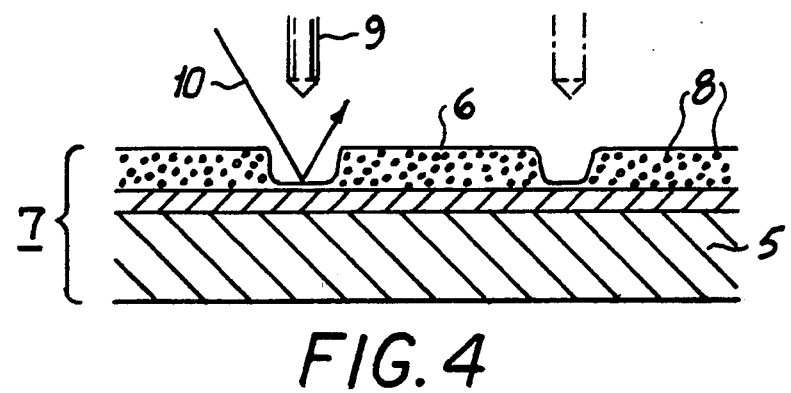
FIG. 4 is a cross sectional view of a recording paper where the recording is made by obtaining transparency or translucency through compressive inscription of a stylus.
Figure 5:
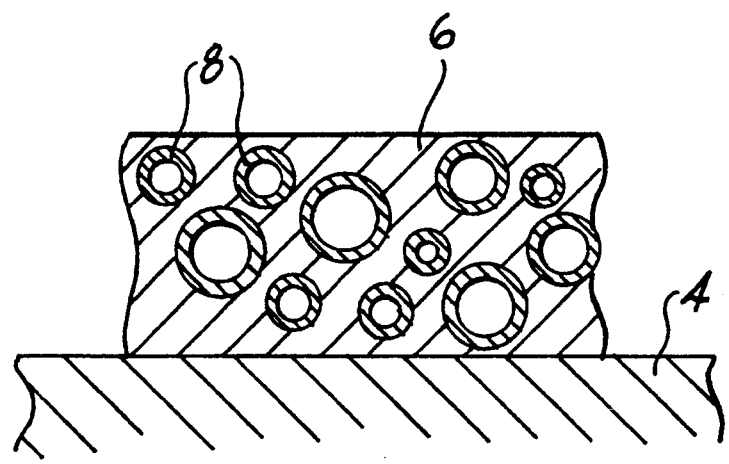
FIG. 5 is a schematic cross sectional view showing the structure of the opaque layer of the invention.

The recording paper 7 (sample Nos. 6 through 10) thus prepared were mounted on a tachograph, and the recording was performed by the inscription with a sapphire needle 9 (see FIGS. 3 and 4). The inscribed recording sheets were taken out and evaluated for such properties as whiteness (visual observation of surface whiteness), appearance (visual observation of surface smoothness), print definition (visual observation of print clearness) and printability (press an adhesive tape on the opaque layer and pull the same to observe the layer's resistance to delamination) using as a standard the commercially available tachograph recording paper (manufactured by Yazaki Sogyo Co., Ltd., where the opaque layer was prepared by applying lacquer coating based on solvent solution of cellulose acetate and nitrocellulose). Evaluation results are shown on Table 2.

TABLE 2

| | Sample Nos. | | | | | |
|---|---|---|---|---|---|---|
| | 6 | 7 | 8 | 8a | 9 | 10 (reference data) |
| whiteness | ⊙ | △ | △ | △ | ○ | ⊙ |
| appearance | ○ | ○ | ○ | ○ | ○ | X |
| print definition | ○ | △ | ○ | ○ | ○ | X |
| printability | ○ | ○ | △ | ○ | ○ | X |

In Table 2, ⊙ denotes better than commercial product, ○ denotes equal to commercial product, △ denotes inferiority to commercial product but usable, and X denotes remarkable inferiority to commercial product and not usable.

Table 2 demonstrates that Sample Nos. 6 and 9 exhibited performance equal to or better than the commercially available tachograph recording paper. Sample Nos. 7, 8 and 8a are appreciably lower in whiteness but are suitable for commercial in respect of appearance, print definition and printability.

As described above, the recording paper of the present invention is prepared by using the water base opacifying compounds, and there is no risk of fire and ignition in the manufacturing process. Therefore, the process of the present invention is safe. Further, since the whitening process is eliminated, the efficiency of productivity can be improved. Furthermore, it is possible to provide the recording papers which have an appearance, print definition and printability equal to those of the conventional recording sheet.

INDUSTRIAL APPLICABILITY

As described above, the recording sheet according to the present invention is suitable for use on a tachograph, a dusk meter and other measuring instruments and useful for recording the changes of rotational speed and electrical current or potential in a semipermanent quality.

What is claimed is:

1. Recording paper comprising a colored substrate coated on at least on surface with an opaque layer comprising a mixture in a ratio of between 1:9 and 9:1, respectively, of an aqueous suspension opacifying polymer particles having voids therein and a polymeric film forming vehicle, said mixture being uniformly applied to said substrate and thereafter dried.

2. The recording paper according to claim 1, wherein said opacifying polymer particles have a core component synthesized by homopolymerization or copolymerization of a methacrylic acid and a sheathing component synthesized by homopolymerization or copolymerization of a styrene monomer, said opacifying polymer particles having a diameter of 0.1 to 5 microns.

3. The recording paper according to claim 1 or 2, wherein the polymeric film forming vehicle has a glass transition temperature (Tg) of not higher than 100° C.

4. The recording paper according to claim 3, wherein the aqueous suspension and the polymeric film forming vehicle are mixed in the ratio of between 1:3 and 6:1.

5. The recording sheet according to claim 4, wherein said opacifying layer has a thickness of 1 to 20 microns.

6. A method of forming recording papers, comprising the steps of preparing a uniform dispersion in a ratio of between 1:9 and 9:1, respectively, of an aqueous suspension of polymer particles having voids therein and an aqueous polymeric film forming vehicle, uniformly coating a surface of a colored sheet substrate with said suspension and thereafter drying said coated substrate.

7. The method according to claim 6, including the step of forming said polymer particles with a core component synthesized by the polymerization of methacrylic acid and a shell component synthesized by the polymerization of a styrene monomer and said polymer particle being of a diameter of between 0.1 and 5 microns.

8. The method according to claim 7, wherein the glass transition temperature (Tg) of said shell component is less than 100° C.

9. The method according to claim 6, wherein the suspension of polymeric particles and the polymeric film forming vehicle are mixed in the ratio of between 1:3 and 6:1.

* * * * *

UNITED STATES PATENT AND TRADEMARK OFFICE
CERTIFICATE OF CORRECTION

PATENT NO. : 5,378,534
DATED : January 3, 1995
INVENTOR(S) : Kuroyanagi, et al.

It is certified that error appears in the above-indentified patent and that said Letters Patent is hereby corrected as shown below:

On the title page, under item [19] and item [75], change "Kuroanagi" to --Kuroyanagi--.

Signed and Sealed this

Twenty-first Day of March, 1995

*Attest:*

BRUCE LEHMAN

*Attesting Officer*     *Commissioner of Patents and Trademarks*